United States Patent
Williams et al.

(10) Patent No.: US 6,715,589 B2
(45) Date of Patent: Apr. 6, 2004

(54) SELF-SERVOING DISC BRAKE ROTOR

(75) Inventors: Neil Williams, Cwmbran (GB); Juergen Dreher, Muelheim-Kaerlich (DE); Roy Lee Hayford, Redford, MI (US); Christos T. Kyrtsos, Southfield, MI (US); Wilfried Giering, Mendig (DE); David L. Brademeyer, Centerville, OH (US); Gerald D. Anderson, Oxford, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/780,831

(22) Filed: Feb. 9, 2001

(65) Prior Publication Data

US 2002/0108819 A1 Aug. 15, 2002

(51) Int. Cl.$^7$ .............................................. F16D 65/00
(52) U.S. Cl. .................... 188/73.1; 188/72.2; 188/72.7
(58) Field of Search ............................. 188/73.1, 72.1, 188/72.2, 72.7, 72.8, 71.1, 71.5, 71.4, 71.3

(56) References Cited

U.S. PATENT DOCUMENTS

| | | | |
|---|---|---|---|
| 2,526,149 A | * 10/1950 | Myers et al. | 188/196 P |
| 2,563,759 A | * 8/1951 | Tiscornia et al. | 188/71.3 |
| 2,575,963 A | * 11/1951 | Kershner | 188/369 |
| 2,595,859 A | * 5/1952 | Lambert et al. | 188/71.3 |
| 2,595,860 A | * 5/1952 | Lambert et al. | 188/152 |
| 2,607,442 A | * 8/1952 | Lucker et al. | 188/152 |
| 2,633,941 A | * 4/1953 | Zindler | 188/106 A |
| 2,633,943 A | * 4/1953 | Lambert | 188/140 R |
| 2,796,153 A | * 6/1957 | Franzen | 188/71.4 |
| 2,889,894 A | * 6/1959 | Lucker et al. | 188/152 |
| 3,269,491 A | * 8/1966 | Belart et al. | 188/196 P |
| 4,360,080 A | * 11/1982 | Tamura | 188/72.7 |
| 4,454,933 A | * 6/1984 | Hunnicutt et al. | 188/196 D |
| 4,702,351 A | * 10/1987 | Price et al. | 188/71.4 |
| 4,790,413 A | 12/1988 | Meynier | |
| 5,012,901 A | * 5/1991 | Campbell et al. | 188/71.4 |
| 5,788,024 A | * 8/1998 | Meyer | 188/72.7 |
| 6,012,556 A | * 1/2000 | Blosch et al. | 188/71.8 |

FOREIGN PATENT DOCUMENTS

| | | |
|---|---|---|
| EP | 0361864 A | 4/1990 |
| EP | 0733819 A | 9/1996 |
| GB | 1005382 A | 9/1965 |

* cited by examiner

*Primary Examiner*—Pam Rodriguez
(74) *Attorney, Agent, or Firm*—Carlson, Gaskey & Olds

(57) ABSTRACT

A self-servoing disc brake assembly is provided that includes a driven rotor member having a first inner surface with a plurality of first pockets. The driven rotor member also includes a first friction surface spaced from the first inner surface. A movable rotor member is supported on the driven rotor member and is movable relative to the driven rotor member between non-servoed and servoed positions. The rotor members are spaced a first distance in the non-servo position, and the rotor members are spaced a second distance which is greater than a first distance in the servo position. The movable rotor member includes a second inner surface with a plurality of second pockets adjacent to the first inner surface and a friction surface spaced from the second inner surface. A plurality of balls are arranged between the first and second pockets with at least one of the first and second pockets being ramped. A friction member, such as a disc brake pad, is arranged adjacent to the second friction surface and is movable between engaged and non-engaged positions. The friction member is spaced from the second friction surface in the non-engaged position and the friction member is in contact with the second friction surface in the engaged position to rotate the movable rotor member to the servoed position and produce a supplemental brake clamping force. As the brake pads are moved into engagement with the driven and movable rotor members, a shear force is created on the second friction surface. The shear force causes the movable rotor member to rotate relative to and away from the driven rotor member. As a result, for a particular brake input force a larger braking torque is achieved.

3 Claims, 2 Drawing Sheets

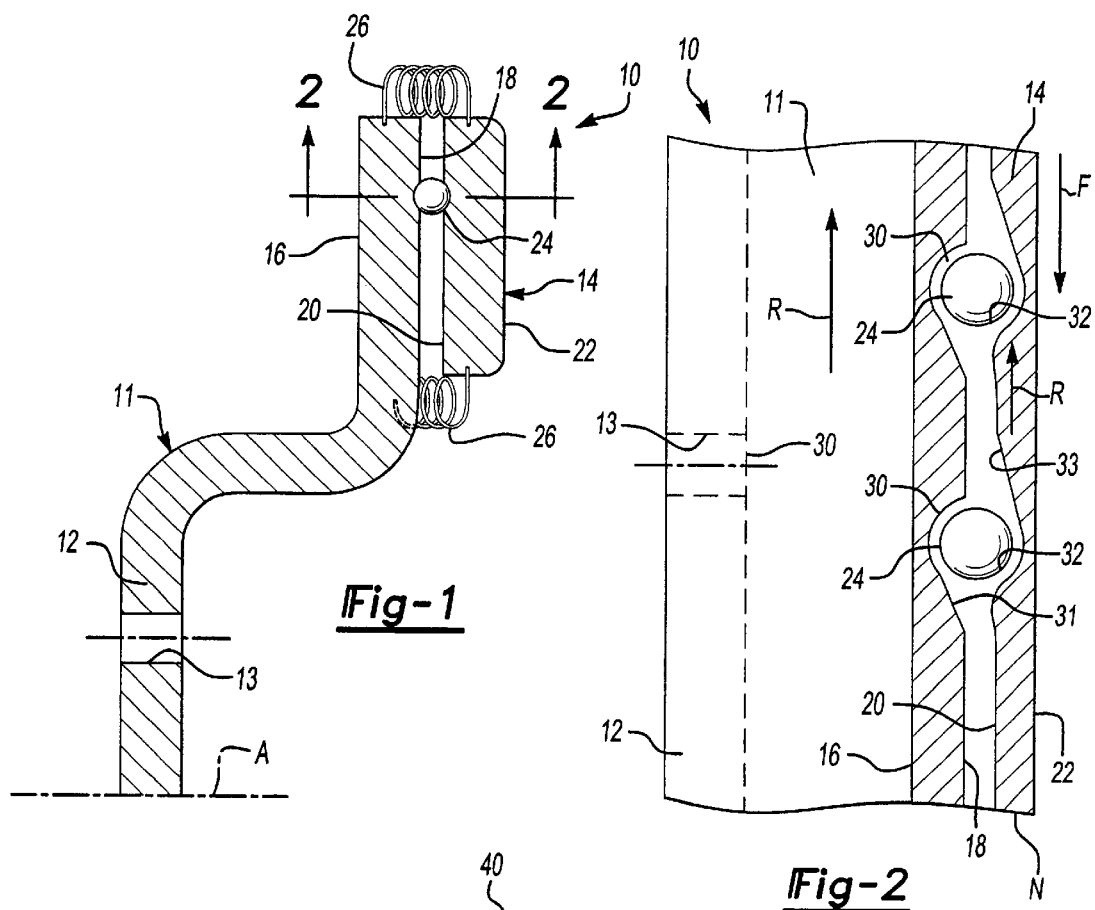
Fig-1
Fig-2
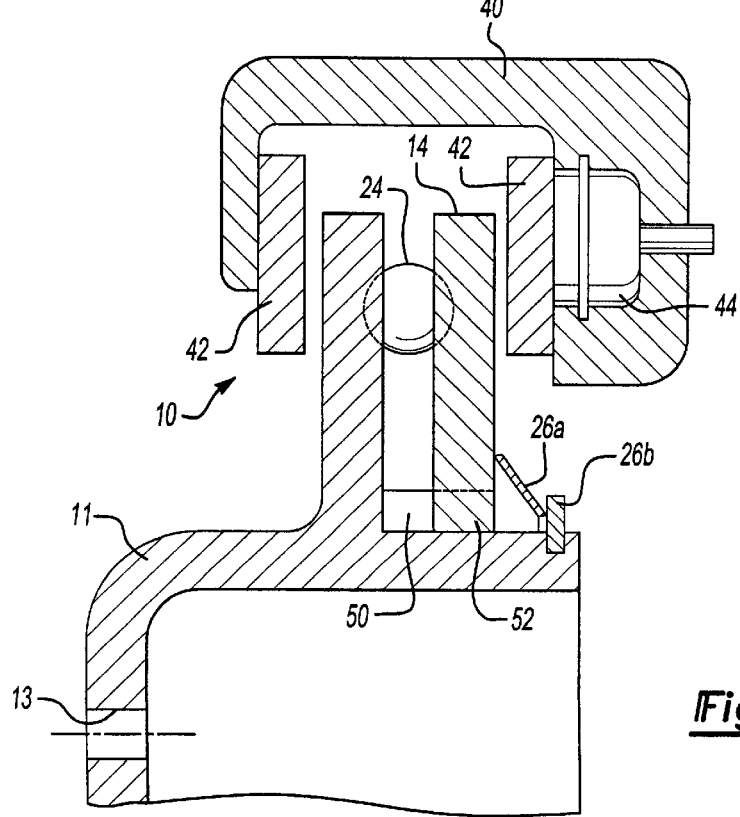
Fig-3

SELF-SERVOING DISC BRAKE ROTOR

BACKGROUND OF THE INVENTION

This invention relates to a rotor for a disc brake assembly, and more specifically, the invention relates to a servoing disc brake rotor.

Servo-type rotor assemblies have been used for various brake applications. Servo rotors typically include a pair of annular members spaced apart from one another. The surfaces of the annular members that face one another include ramped pockets that receive a plurality of balls therebetween. When one of the members is rotated relative to the other member, the balls and ramps cause the members to move away from one another. That is, as the members are rotated relative to one another, the rotor assembly becomes wider.

Such rotor assemblies have been used as brake adjusters in brake actuators. As the friction members wear in the brake assembly the servo rotor members are rotated relative to one another to take up clearance in the brake assembly due to wear. The servo rotors for these applications do not create any braking force.

Servo rotors assemblies have also been used to apply a braking force to rotating members in a vehicle. An annular housing having a U-shaped cross-section is attached to a rotating member such as a vehicle wheel or clutch. The servo rotor is disposed within the housing. Outer surfaces of the annular rotor members have friction linings adjacent to the housing. At least one hydraulic actuator interconnects the arcuate members for moving the members rotationally relative to one another. The friction lining on the members engage the housing to apply a braking force and slow the rotating member. The servo rotors for these applications have been the only braking force and have not been used to supplement conventional braking mechanisms.

For conventional disc brake assemblies a particular brake input force will provide a particular brake torque. It is desirable to increase the brake torque without increasing the brake input force. However, providing additional brake torque has required either additional braking mechanisms that have additional actuators or more robust brake components that can provide the higher brake input force. Therefore, what is needed is a passive brake component that is capable of providing a supplemental brake clamping force to current brake input forces and provide an increased brake torque.

SUMMARY OF THE INVENTION AND ADVANTAGES

The present invention provides a self-servoing disc brake assembly that includes a driven rotor member having a first inner surface with a plurality of first pockets. The driven rotor member also includes a first friction surface spaced from the first inner surface. A movable rotor member is supported on the driven rotor member and is movable relative to the driven rotor member between non-servoed and servoed positions. The friction surfaces are spaced a first distance in the non-servo position, and the friction surfaces are spaced a second distance which is greater than a first distance in the servo position. The movable rotor member includes a second inner surface with a plurality of second pockets adjacent to the first inner surface and a friction surface spaced from the second inner surface. A plurality of balls are arranged between the first and second pockets with at least one of the first and second pockets being ramped. A friction member, such as a disc brake pad, is arranged adjacent to the first friction surface and is movable between engaged and non-engaged positions. The friction member is spaced from the second friction surface in the non-engaged position and the friction member is in contact with the second friction surface in the engaged position to rotate the movable rotor member to the servoed position and produce a supplemental brake clamping force. As the brake pads are moved into engagement with the driven and movable rotor members, a shear force is created on the second friction surface. The shear force causes the movable rotor member to rotate relative to and away from the driven rotor member. As a result, for a particular brake input force a larger braking torque is achieved.

Accordingly, the above invention provides a passive brake component that is capable of providing a supplemental brake clamping force to current brake input forces to provide an increased brake torque.

BRIEF DESCRIPTION OF THE DRAWINGS

Other advantages of the present invention can be understood by reference to the following detailed description when considered in connection with the accompanying drawings wherein:

FIG. 1 is a cross-sectional view of the brake assembly of the present invention;

FIG. 2 is a cross-sectional view of the brake assembly taken along line 2—2 in FIG. 1;

FIG. 3 is another embodiment of the brake assembly of the present invention;

DETAILED DESCRIPTION OF THE PREFERRED EMBODIMENT

Figure 4:
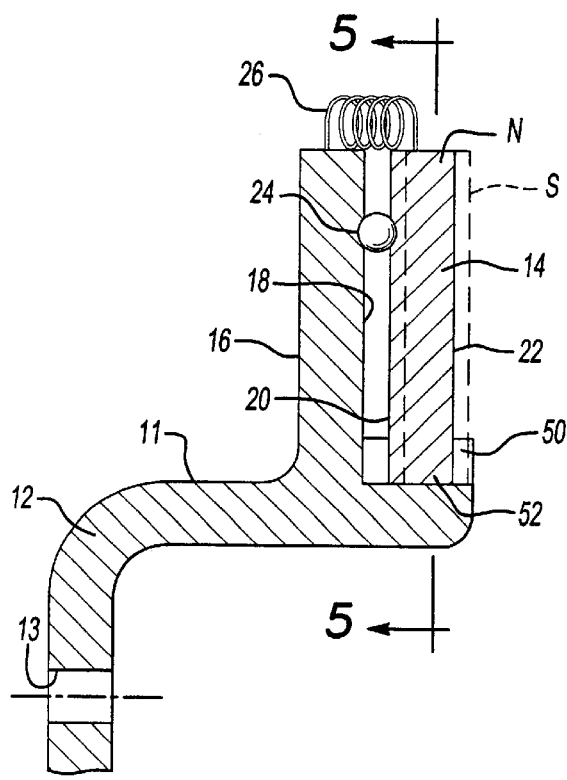
FIG. 4 is yet another embodiment of the present invention.

A brake assembly 10 of the present invention is shown in FIG. 1. The brake assembly 10 includes a driven rotor member 11 that has a hub 12 and a plurality of apertures 13 for securing the driven rotor member 11 to an axle. A movable rotor member 14 is supported on the driven rotor member 11 for movement relative thereto. Driven rotor member 11 has a first friction surface 16 and a first inner surface 18 spaced from the first friction surface 16. The movable rotor member 14 includes a second inner surface 20 which faces the first inner surface 18, and a second friction surface 22 spaced from the second inner surface 20. Preferably, the friction surfaces 16, 22 are annular and are adapted to be engaged by friction linings, or brake pads, as is known in the art.

Referring to FIG. 2, the inner surfaces 18, 20 include first 30 and second 32 pockets, respectively. A plurality of balls 24 are arranged between the inner surfaces 18, 20 and received in the pockets 30, 32. Biasing springs 26 interconnect the driven 11 and movable 14 rotor members to seat the balls 24 in the pockets 30, 32. The first 30 and second 32 pockets include ramped surfaces 31, 33, respectively, which are inclined in a direction opposite one another. The biasing springs 26 seat the balls into the deepest parts of the pockets 30, 32 so that the movable rotor member 14 is at its closest position to the driven rotor member 11 in a non-servoed position N. The biasing springs 26 may be of any configuration. For example, the biasing springs may include a Belleville spring 26a and a retainer 26b for retaining the Belleville spring 26a onto the driven rotor member 11, as shown in FIG. 3.

The brake assembly 10 includes a caliper 40, as is known in the art, and brake pads 42 adjacent to the friction surfaces 16, 22. An actuator 44, which is shown schematically in FIG. 3, forces the brake pads 42 into engagement with the friction surfaces 16, 22 in response to a particular brake input force. The driven 11 and movable 14 rotor members are driven together about axis A in a direction of rotation R. As the actuator 44 moves the brake pads 42 from a non-engaged position in which the brake pads 42 are not in contact with the friction surfaces 16, 22, to an engaged position in which the brake pads 42 are in contact with the friction surfaces 16, 22, a shear force F is generated on second friction surface 22. The shear force F causes the movable rotor member 14 to move in a direction opposite the direction of rotation R. The balls 24 move along the ramp surfaces 31, 33 and cause the movable member 14 to move away from the driven rotor member 11.

Figure 5:
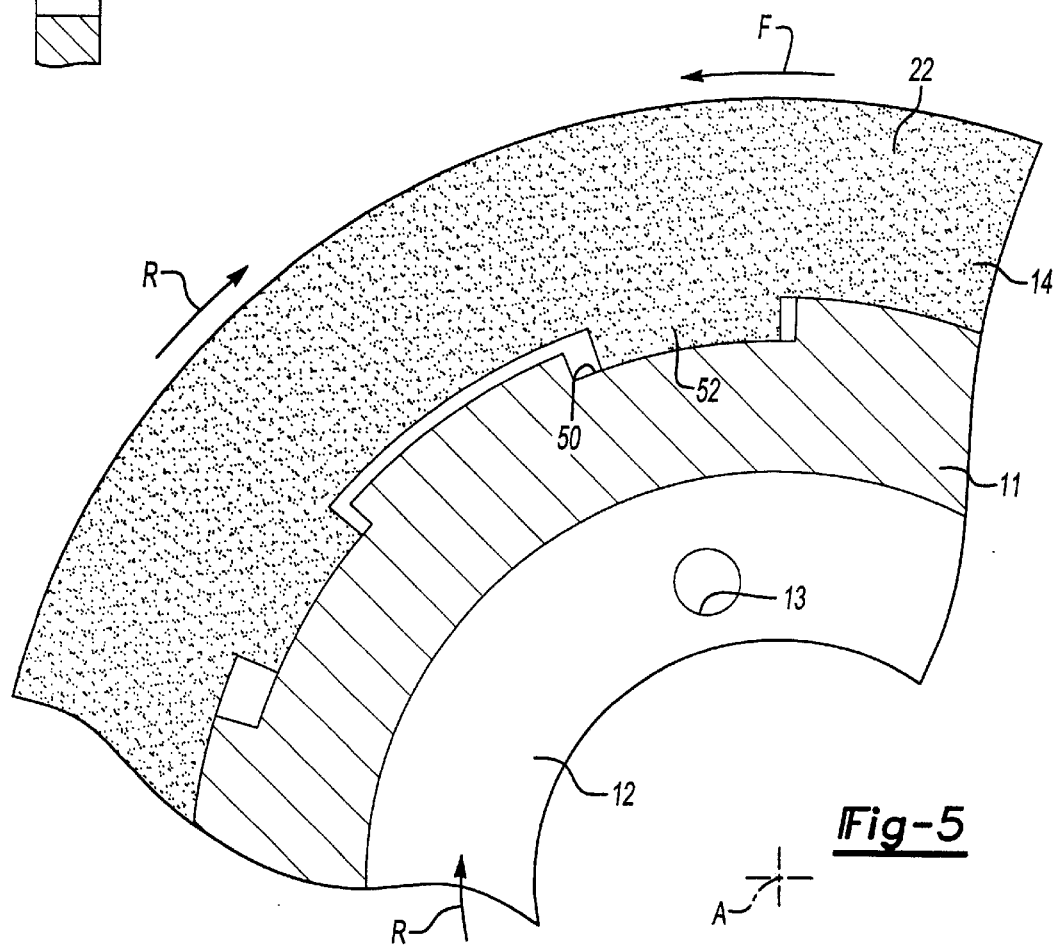
FIG. 5 is a cross-sectional view of the brake assembly taken along line 5—5 in FIG. 4.

To limit the relative movement between the movable rotor member 14 and the driven rotor member 11, the members may include interlocking recesses 50 and protrusions 52, shown in FIGS. 3–5. As best shown in FIG. 5, one of the rotor members, such as the driven rotor member 11, may include a plurality of recesses 50 for receiving the protrusions 52 extending from the movable rotor member 14. In this manner, the rotor members II, 14 are interlocked so that the rotor members 11, 14 rotate together in the direction of rotation R when the brake pads 42 are in the non-engaged position. Moreover, the recesses 50 and protrusions 52 permit relative rotation between the rotor members 11, 14 when the shear force F is created on the second friction surface 22 by the brake pads 42 so that the movable rotor member 14 may rotate relative to and away from the driven rotor member 11.

In operation, the driven rotor member is driven about an axis A. The brake pads are moved from a non-engaged position into engagement with the friction surfaces 16, 22 in an engaged position. A shear force F is created on the second friction surface 22 of the movable rotor member 14. The shear force F causes the movable rotor member 14 to rotate relative to and away from the driven rotor member 11. During this relative movement the balls 24 move up the ramped surfaces 31, 31 Initially the friction surfaces 16, 22 are spaced from one another a first distance. As the rotor members 11, 14 move from the non-servoed position N to the servoed position S, best shown in FIG. 4, in which the balls 24 move up the ramped surfaces 31, 33, the distance between the friction surfaces 16, 22 increases. The increased width of the rotor members 11, 14 generates a supplemental brake clamping force. That is, for a particular brake input force additional braking torque is provided as the shear force F causes the movable rotor member 14 to move relative to and away from the driven rotor member 11. As a result, supplemental brake torque is provided for a particular brake input force.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A self-servoing disc brake assembly comprising:
a driven rotor member including a first inner face with a plurality of first pockets, and a first friction surface spaced from said first inner surface;
a movable rotor member supported on said driven rotor member and movable relative to said driven rotor member between non-servoed and servoed positions in which said rotor members are spaced a first distance in said non-servoed position and said rotor members arc spaced a second distance greater than said first distance in said servoed position, said movable rotor member including a second inner face with a plurality of second pockets adjacent to said first inner face and a second friction surface spaced from said second inner face;
a plurality of balls interposed between said first and second pockets with at least one of said first and second pockets being ramped;
a friction member adjacent to said second friction surface and moveable between engaged and non-engaged positions in which said friction member is spaced from said second friction surface in said non-engaged position and said friction member is in contact with said second friction surface in said engaged position to rotate said movable rotor member to said servoed position and produce a supplemental brake clamping force; and
wherein said driven rotor member is rotatable about an axis and said movable rotor member is movable relative to said driven rotor member about and along said axis between said non-servoed and servoed positions, and wherein one of said rotor members include a radial recess and the other of said rotor members includes a radial protrusion received in said radial recess that is smaller than said radial recess for permitting limited rotation of said moveable rotor member about said axis relative to said driven rotor member.

2. A self-servoing disc brake assembly comprising:
a driven rotor member rotatable about an axis at least one revolution including a first inner face with a plurality of first pockets, and a first friction surface spaced from said first inner surface;
a movable rotor member supported on said driven rotor member and movable relative to said driven rotor member between non-servoed and servoed positions in which said rotor members are spaced a first distance in said non-servoed position and said rotor members arc spaced a second distance greater than said first distance in said servoed position, said movable rotor member including a second inner face with a plurality of second pockets adjacent to said first inner face and a second friction surface spaced from said second inner face;
a plurality of balls interposed between said first and second pockets wit at least one of said first and second pockets being ramped;
a friction member adjacent to said second friction surface and nioveable between engaged and non-engaged positions in which said friction member is spaced from said second friction surface in said non-engaged position and said friction member is in contact with said second friction surface in said engaged position to rotate said movable rotor member to said servoed position and produce a supplemental brake clamping force; and
at least one return spring biasing said movable rotor member toward said driven rotor member to said non-servoed position wherein said at least one return spring comprises a Belleville spring proximate to said second Friction surface.

3. The assembly according to claim 2, wherein said return spring comprises a plurality of coil springs interconnecting said rotor members.

* * * * *

UNITED STATES PATENT AND TRADEMARK OFFICE
CERTIFICATE OF CORRECTION

PATENT NO.    : 6,715,589 B2
DATED         : April 6, 2004
INVENTOR(S)   : Williams et al.

It is certified that error appears in the above-identified patent and that said Letters Patent is hereby corrected as shown below:

Column 4,
Line 41, "arc" should be -- are --.
Line 48, "wit" should be -- with --.
Line 51, "nioveable" should be -- moveable --.

Signed and Sealed this

Twenty-fifth Day of May, 2004

JON W. DUDAS
*Acting Director of the United States Patent and Trademark Office*